(No Model.)

J. LAWLOR.

SPLIT GEAR.

No. 331,978.

Patented Dec. 8, 1885.

WITNESSES:

INVENTOR:
J. Lawlor
BY Munn & Co
ATTORNEYS.

UNITED STATES PATENT OFFICE.

JAMES LAWLOR, OF FALL RIVER, MASSACHUSETTS.

SPLIT GEAR.

SPECIFICATION forming part of Letters Patent No. 331,978, dated December 8, 1885.

Application filed October 31, 1885. Serial No. 181,468. (No model.)

*To all whom it may concern:*

Be it known that I, JAMES LAWLOR, of Fall River, in the county of Bristol and State of Massachusetts, have invented a new and Improved Split Gear, of which the following is a full, clear, and exact description.

The object of my invention is to provide a new and improved split-gear or ratchet wheel which can readily be secured on a shaft or removed from the same without requiring the other wheels and pulleys on the said shaft to be removed.

The invention consists in the combination, with a flanged hub, of two or more wheel-sections bolted on the flange, which sections are provided with side recesses for receiving the flange.

Reference is to be had to the accompanying drawings, forming part of this specification, in which similar letters of reference indicate corresponding parts in both the figures.

Figure 1:
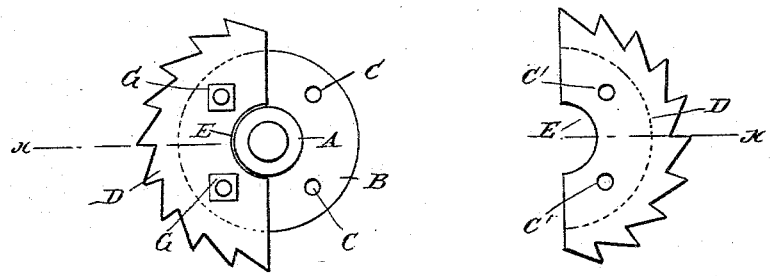
Figure 2:
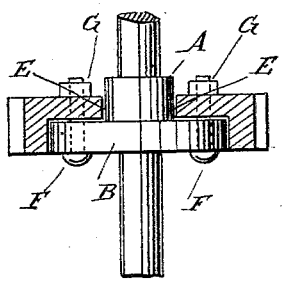

Figure 1 is a face view of my improved split gear, showing the sections detached. Fig. 2 is a sectional plan view of the same on the line $x$ $x$, Fig. 1.

A hub, A, provided at one end with an annular flange, B, is keyed or otherwise securely fastened on the shaft B. The flange B is provided with a series of apertures, C, through which bolts F can be passed.

The gear or ratchet wheel is formed of two or more semicircular or segmental sections, D, having teeth formed in the outer rim and having a recess, E, for receiving part of the hub in the inner rim, the said sections being provided with apertures C', through which the bolts F can be passed. Each section D is provided in one side with a semicircular or segmental recess for receiving part of the flange B. The sections D are placed against the hub and flange in such a manner that the inner edges or rims of the sections rest on the hub, and the flange presses into the recesses in the sides of the sections. The bolts are then passed through the apertures C in the flange and the aperture C' in the sections, the nuts G are screwed on the bolts, and are drawn tight to hold the sections D firmly on the hub and flange.

A gear, ratchet, or other wheel can thus be secured on the shaft very easily and rapidly without requiring the other pulleys, wheels, &c., on the shaft to be removed.

My improved split-gear wheel has the advantage that it is not split across the teeth, as the split-gear wheels are usually made.

Having thus described my invention, what I claim as new, and desire to secure by Letters Patent, is—

1. The combination, with a flanged hub, of two or more wheel-sections bolted on the flange, substantially as herein shown and described.

2. The combination, with a flanged hub, of two or more wheel-sections provided in the sides with recesses for receiving the flange, and which wheel-sections are bolted on the flange, substantially as herein shown and described.

3. The combination, with the hub A, having a flange, B, at one end, of two or more wheel-sections, D, each having a recess in one side, and of bolts passed through the wheel-sections and through the flange, substantially as herein shown and described.

JAMES LAWLOR.

Witnesses:
 JONAS CHAPMAN,
 SAMUEL BOTTOM.